United States Patent [19]

Koskenohi

[11] Patent Number: 4,770,537
[45] Date of Patent: Sep. 13, 1988

[54] APPARATUS FOR OPTICAL MEASUREMENT OF THE SHAPE OF OBLONG OBJECTS

[76] Inventor: Kimmo Koskenohi, Marjaniementie 50, 00930 Helsinki 93, Finland

[21] Appl. No.: 689,685

[22] Filed: Jan. 8, 1985

[30] Foreign Application Priority Data

Jan. 17, 1984 [FI] Finland .................................. 840174

[51] Int. Cl.⁴ .............................................. G01B 11/02
[52] U.S. Cl. ...................................... 356/384; 356/383
[58] Field of Search ............................... 356/384–387, 356/383

[56] References Cited

U.S. PATENT DOCUMENTS 4,021,119  5/1977  Stauffer ............................. 356/386
4,351,437  9/1982  Long ................................... 356/386

FOREIGN PATENT DOCUMENTS 0022903  2/1983  Japan ................................... 356/384

Primary Examiner—R. A. Rosenberger
Assistant Examiner—Crystal Cooper
Attorney, Agent, or Firm—Birch, Stewart, Kolasch, & Birch

[57] ABSTRACT

An apparatus for optical measurement of the shape of oblong objects. The apparatus having a measurement base for an object to be measured, a camera, and image processing means connected to the camera for processing the images information received from the camera into control data. A mirror is positioned at a distance from the measurement base for reflecting the image of the object located on the measurement base to the optics of the camera. The reflecting face of the mirror has a curvedness that is different in the longitudinal direction the object as compared with the width direction so that the image of the object, reflected to the optics of the camera is reduced in the longitudinal direction as compared with the width direction. A slot disc is included in the optics of the mirror and provided with a narrow slot-shaped opening arranged so that component beams of light depicting the length of the object to be measured can pass through the optics only within an area corresponding to the width of the opening, whereas component beams of light depicting the width of the object can pass through the optics within an area corresponding to the length of the entire opening.

19 Claims, 2 Drawing Sheets

APPARATUS FOR OPTICAL MEASUREMENT OF THE SHAPE OF OBLONG OBJECTS

BACKGROUND OF THE INVENTION

The present invention concerns equipment for optical measurement of the shape of oblong objects.

When the shape of oblong objects, e.g., boards, is measured optically, a difficulty arises in the fact that the geometrical shape of the objects to be measured differs substantially from the shape of the image area (e.g., square) of the measuring instrument. If the entire object to be measured fits inside the picture area, the relative dimensional accuracy of its width dimension is approximately one order of magnitude inferior to the relative dimensional accuracy of the length dimension.

Attempts have been made to resolve this problem, e.g., several cameras are fitted along a line in the longitudinal direction of the object to be measured. However, a high number of apparatuses are required as well as the difficulty of joining the images together.

Another prior-art mode is to depict an object moving in the field of vision as several subsequent pictures. A drawback of this solution is providing a sufficiently long undisturbed run for the object.

SUMMARY OF THE INVENTION

An object of the present invention is to eliminate the drawbacks present in prior-art solutions and to provide equipment of a novel type for optical measurement of the shape of oblong objects.

The invention is based on the concept that a picture is distorted by means of a mirror or lens having a different curve radius in the different directions so that the measurement camera "sees" the length and width dimensions of the object to be measured as being of the same order of magnitude and the sharpness of the picture is retained by using a slot-shaped opening in the measurement optics of the camera.

By means of the present invention, considerable advantages are obtained. Thus, even a long object can be accommodated in the picture area of the measuring camera. Moreover, owing to the reduction of the image of the oblong object in the longitudinal direction by means of a mirror, the relative dimensional accuracy in the longitudinal direction can be made as equally high as in the transverse direction of the object (e.g., 1% of the width and 1% of the length even though the length is 10-fold as compared with the width).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
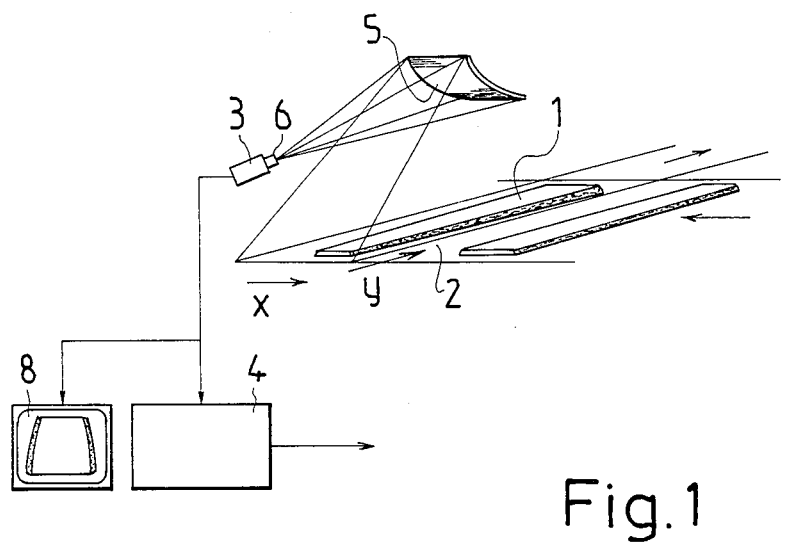
FIG. 1 is a partly schematical perspective view of one apparatus of the equipment in accordance with the present invention.
Figure 3:
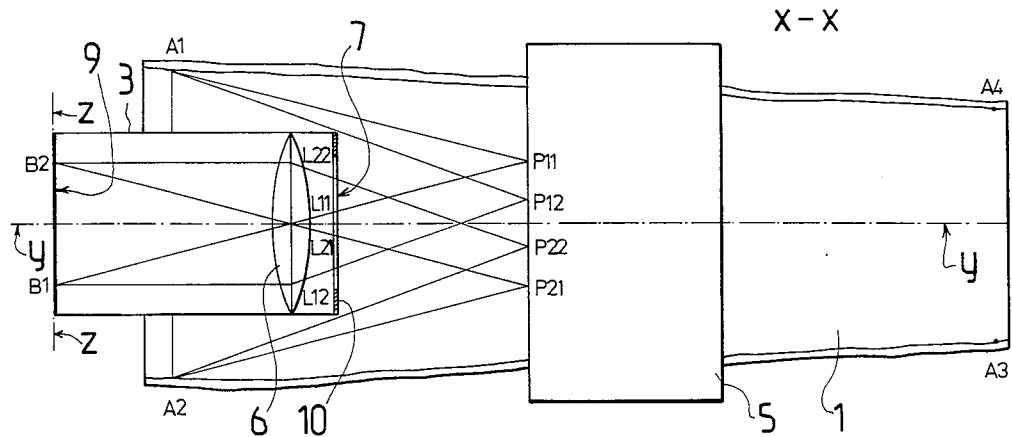
FIG. 3 is a schematical presentation of a part of the apparatus shown in FIG. 1, as a sectional top view.
Figure 4:
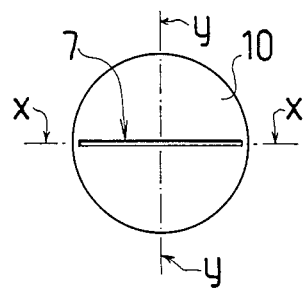
FIG. 4 shows a slot disc to be positioned in front of the camera, as viewed from the front.

As is shown in FIG. 1, the apparatus in accordance with the invention present comprises a measurement base 2, onto which sawn pieces of timber 1 are fed one by one, onto the measurement base 2. Above the measurement base 2, a mirror 5 is positioned, whose function is to reflect the image of the piece 1 placed on the measurement base 2 to the optics 6 of the camera 3. The camera 3, preferably a video camera, is connected to the image processing equipment 4 so as to process the image information received from the camera 3 into control data, e.g., for optimization of the sawing operation. A reduced image of the piece 1 can be observed from an observation monitor 8. The mirror 5 and camera 3 are located in the longitudinal normal plane of the measurement area of the measurement base 2 in a preferred embodiment as shown in FIG. 3.

Figure 5:
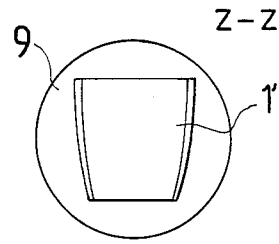
FIG. 5 shows an image of the object to be measured, reduced in the longitudinal direction, on the image plane of the camera.
Figure 6:
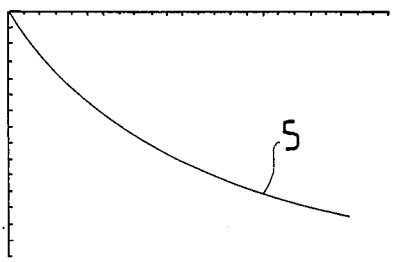
FIG. 6 shows one practical profile of the mirror face.

The reflecting face of the mirror 5 has different curvatures in the longitudinal and transverse directions so that the image of the piece 1 reflected to the optics 6 of the camera 3 has been reduced in the longitudinal direction as compared with the transverse direction (FIG. 5 shows an image of an oblong object reduced in the longitudinal direction on the image plane of camera 3). The profile of the reflecting face of the mirror 5 in the longitudinal direction of the piece 1 to be measured is convex towards the piece 1 to be measured, whereas the profile of the reflecting face in the transverse direction of the piece 1 to be measured is linear. This causes the length of the piece 1 to be measured on the image plane of the camera 3 to be reduced so that its order of magnitude (dimension) becomes similar to that of the width of the piece 1.

For maintaining accuracy of measurement, a narrow slot-shaped opening 7 is included in the optics 6 of the camera 3, which opening is, in the example case, positioned horizontally and transversely to the longitudinal direction 1 of the piece 1 to be measured. This opening 7 acts so that the component beams of light depicting the length of the piece 1 to be measured can pass through the optics 6 only within an area corresponding to the width of the opening 7. On the contrary, the component beams of light depicting the width of the piece 1 may pass through the optics 6 within an area corresponding to the entire length of the opening 7.

During operation of the apparatus, when lumber is being edged, the board 1 arrives at the examination site in the transverse position and goes on from there after aligning to the edging phase. By means of the curved mirror 5, the image area of the measurement camera 3 covers the entire board 1. The image area may be, e.g., 600 mm × 6000 mm in size, whereat the camera 3 forms a video image at the ratio of 4/3 of its size, which image is viewed in the monitor 8. The video signal containing the same information is digitalized and transmitted to the control computer, which analyzes the shape of the piece from the image, optimizes the sawing position, and gives the necessary data for alignment.

Figure 2:
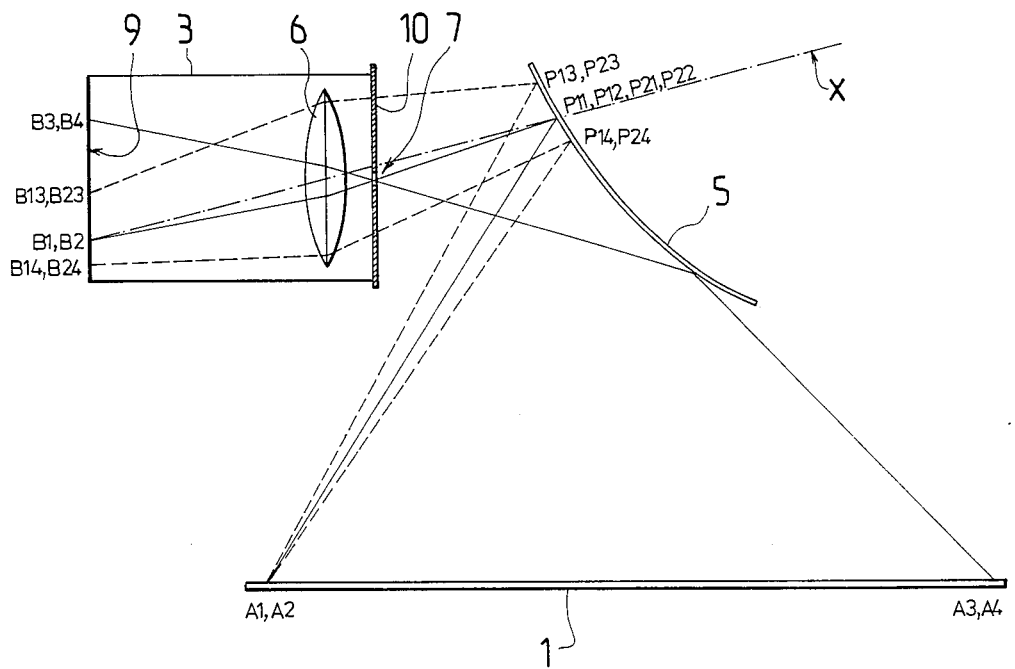
FIG. 2 is a schematical presentation of a part of the apparatus shown in FIG. 1, as a sectional side view.

The principle of retaining the sharpness of the picture is shown in FIGS. 2 and 3. In these figures, the distance between some points to be measured located on piece 1 are depicted through the mirror 5 on the picture plane 9 of the camera 3 as illustrated. For the sake of clarity, a mirror 5 curved in one main direction only has been used as an example. Thus, in the sectional plane YZ the mirror 5 is curved, and in the plane XY, on the other hand, linear.

As is shown in FIG. 3, all the beams of light passing in the sectional plane XY meet the linear mirror face and are, in accordance with the well-known laws of optics, depicted on the image plane in a sharp way, i.e., all the beams of light coming from one point along different routes arrive at the same point on the image plane 9. FIG. 3 shows the beams departing from points A1 and A2, which said beams pass along the following routes:

point A1: A1, P11, L11, B1 and A1, P12, L12, B1;
point A2: A2, P21, L21, B2 and A2, P22, L22, B2.

The points A3 and A4 are depicted in the corresponding way on the image plane 9.

In the plane YZ, owing to the curvedness of the mirror 5, the beams of light running along different routes no longer meet the image plane 9 in the same place, but the points are depicted as lines. FIG. 2 shows the routes of three beams of light departing from point A1 or A2:

A1, P11, B1, which ends at the same point as the light depicted in the plane YX in FIG. 3, as well as the routes: A1, P13, B13, and A1, P14, B14.

Slot disc 10, prevents the access of the last-mentioned beams onto the image plane 9, so that each point A is depicted as one point B only, so that the curvedness of the mirror 5 does not deteriorate the sharpness of the image on image plane 9.

Under these circumstances, the apparatus functions as a camera provided with a normal lens in the X-direction and a pin-hole camera in the Y-direction. In this way a sufficient sensitivity is obtained in spite of the pin hole properties.

The effect of the curvedness of the mirror 5 can be expressed as the degree of unsharpness of the image on the image plane 9 by the following expression:

$$\frac{R \times LPA}{HY \times LLA},$$

wherein
R = height of slot 7
HY = height of mirror 5 (as seen from camera 3)
LPA = distance from mirror 5 to object
LLA = distance from lens 6 to object.

Within the scope of the invention, it is also possible to conceive solutions differing from the exemplifying embodiment described above. Thus, if necessary, the mirror may be curved in both directions, e.g., concave in one direction and convex in the other direction, or convex in both directions. When the shape of small objects is measured, one might think of positioning the mirror so as to reflect the image of the piece to be measured in the transverse direction, whereby the video camera would be placed at the side of the measurement base. In such a case, the mirror would be appropriately, e.g., concave in one direction and linear in the other direction. It should be stated that the basic idea of the invention also includes as an equivalent solution of utilizing a lens in place of the mirror, e.g., convex in one direction and concave in the direction perpendicular to the said direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for the optical measurement of the shape of oblong objects, each of said oblong objects having a longitudinal dimension and a width dimension, said apparatus comprising:

a measurement base for the oblong objects to be measured;

a camera means with optics for obtaining image information relating to each of the oblong objects to be measured;

image processing means connected to the camera means for processing the image information received from the camera means into control data;

a mirror having a longitudinal and a width direction and a reflecting face and being placed at a distance from the measurement base, for reflecting the image of the oblong objects on the measurement base to the optics of the camera means, the reflecting face of the mirror having a curvedness that is different in the longitudinal direction of the oblong objects as compared with the width direction for reducing the image of each of the oblong objects reflected to the optics of the camera means in the longitudinal direction as compared with the width direction, the reflecting face of the mirror having a profile in the longitudinal direction of the oblong objects to be measured being convex towards the oblong objects to be measured; and a slot disc included in the optics of the mirror and provided with a narrow slot-shaped opening arranged for passing component beams of light depicting the length of each of the oblong objects to be measured through the optics only within an area corresponding to the width of the opening, whereas component beams of light depicting the width of each of the oblong objects can pass through the optics within an area corresponding to the length of the entire opening;

whereby an image of each of the oblong objects received by the optics of the camera from the mirror has substantially the same longitudinal dimension as the width dimension for increasing precision of measurement of the oblong objects.

2. The apparatus according to claim 1, wherein the profile of the reflecting face of the mirror in the transverse direction of the object to be measured is approximately linear.

3. The apparatus according to claim 1, wherein both the mirror and the camera means are located in the longitudinal normal plane of the measurement area of the measurement base.

4. The apparatus according to claim 1, wherein the measurement base is horizontal and the slot-shaped opening is horizontal and transverse to the longitudinal direction of the object to be measured.

5. The apparatus according to claim 1, wherein the slot disc is located outside of the optics of the camera.

6. The apparatus according to claim 1, wherein the profile of the reflecting face of the mirror in the transverse direction of the object to be measured is approximately linear.

7. The apparatus according to claim 2, wherein both the mirror and the camera means are located in the longitudinal normal plane of the measurement area of the measurement base.

8. An apparatus for the optical measurement of the shape of an oblong object, said oblong object having a longitudinal dimension and a width dimension, said apparatus comprising:

a measurement base for supporting the oblong object;

a mirror having a curved reflecting surface with a plane of curvature, said mirror being positioned adjacent said measurement base, said reflecting surface of said mirror in a longitudinal direction of the oblong object to be measured being convex towards the oblong object to be measured;

a camera with optics for receiving and focusing a reflected image from said mirror of the oblong object supported on said measurement base;

image processing means for processing the reflected image received and focused by said camera into usable measurement information including the dimensions of the oblong object; and a plate provided with a slot-shaped opening therein, said slot-shaped opening in said plate being positioned between said optics of said camera and said mirror, said slot being positioned substantially perpendicular to said plane of curvature of said reflecting surface of said mirror for providing a sharp image of the object reflected by said curved reflecting surface of said mirror to said camera, said curved reflecting surface having a predetermined radius of curvature for providing a reflected image of the oblong object to said camera in which the longitudinal and width dimensions of the reflected image of the oblong object are substantially the same dimension for increasing precision of measurement of the dimensions of the oblong object.

9. The apparatus according to claim 8, wherein said reflecting surface of said mirror in a transverse direction of the object to be measured is approximately linear.

10. The apparatus according to claim 8, wherein both said mirror and said camera are located in a longitudinal normal plane of a measurement area of said measurement base.

11. The apparatus according to claim 8, wherein the oblong measurement base is substantially horizontal and said slot-shaped opening is substantially horizontal and transverse to a longitudinal direction of the object to be measured.

12. The apparatus according to claim 10, wherein the oblong measurement base is substantially horizontal and said slot-shaped opening is substantially horizontal and transverse to a longitudinal direction of the object to be measured.

13. The apparatus according to claim 8, including an observation monitor for viewing the reflected image received by said camera.

14. An apparatus for the optical measurement of the shape and optimization of a cutting operation of an oblong object, said apparatus comprising:

a measurement base for supporting the oblong object with said oblong object defined as having two substantially perpendicular dimensions of different lengths;

a mirror having a curved reflecting surface with a plane of curvature, said mirror being positioned adjacent said measurement base, said curved reflecting surface of said mirror in a longitudinal direction of the oblong object to be measured being convex towards the oblong object to be measured;

a camera with optics for receiving and focusing a reflected image from said mirror of the oblong object;

image processing means for processing the reflected image received and focused by said camera into control data for optimization of the cutting operation of the oblong object; and a plate provided with a slot-shaped opening therein, said slot-shaped opening in said plate being positioned between said optics of said camera and said mirror, said slot being positioned substantially perpendicular to said plane of curvature of said reflecting surface of said mirror for providing a sharp image of the oblong object reflected by said curved reflecting surface of said mirror to said camera, said curved reflecting surface having a predetermined radius of curvature for providing a reflected image of the oblong object to said camera in which the two perpendicular dimensions of the reflected image of the oblong object are of substantially the same dimension for increasing precision of measurement of the dimensions of the oblong object.

15. The apparatus according to claim 16, wherein said reflecting surface of said mirror in a transverse direction of the object to be measured is approximately linear.

16. The apparatus according to claim 14, wherein both said mirror and said camera means are located in a longitudinal normal plane of a measurement area of said measurement base.

17. The apparatus according to claim 14, wherein the measurement base is substantially horizontal and said slot-shaped opening is substantially horizontal and transverse to a longitudinal direction of the oblong object to be measured.

18. The apparatus according to claim 16, wherein the measurement base is substantially horizontal and said slot-shaped opening is substantially horizontal and transverse to a longitudinal direction of the oblong object to be measured.

19. The apparatus according to claim 14, including an observation monitor for viewing the reflected image received by said camera.

* * * * *